United States Patent [19]
Meares

[11] 3,800,225
[45] Mar. 26, 1974

[54] DIFFERENTIAL PULSE-CODE MODULATION

[75] Inventor: David John Meares, Sussex, England

[73] Assignees: The Marconi Company Limited; Standard Telephones & Cables Limited, both of London, England

[22] Filed: Sept. 19, 1972

[21] Appl. No.: 290,408

[52] U.S. Cl. ....... 325/38 B, 340/347 AD, 332/11 D
[51] Int. Cl. .......................... H03k 5/08, H04b 1/00
[58] Field of Search ............. 325/38 R, 38 A, 38 B; 340/347 AD; 332/11 D

[56] References Cited

UNITED STATES PATENTS

| | | | |
|---|---|---|---|
| 3,354,267 | 11/1967 | Crater | 325/38 B |
| 2,724,740 | 11/1955 | Cutler | 325/38 B |
| 2,927,962 | 3/1960 | Cutler | 325/38 B |
| 3,456,199 | 7/1969 | Van Gerwen | 325/38 B |
| 3,707,680 | 12/1972 | Gabbard et al. | 325/38 B |

*Primary Examiner*—Thomas A. Robinson
*Attorney, Agent, or Firm*—Kemon, Palmer & Estabrook

[57] ABSTRACT

An input signal which includes a high-frequency component of frequency *f*, such as a colour television signal having a colour subcarrier, is encoded by sampling the signal at a sampling frequency of N*f* where N is a small integral ratio, typically 3, taking the difference between samples which are N samples apart, and encoding this difference with a non-linear quantizing scale. Preferably the sampling takes place as an initial step and thereafter the signals are processed digitally.

14 Claims, 6 Drawing Figures

DIFFERENTIAL PULSE-CODE MODULATION

This invention relates to a method of differential pulse code modulation (d.p.c.m.) and to apparatus for use in the method.

D.p.c.m. systems are based upon the principle of taking the difference between two consecutive samples of an input signal and encoding this difference. In actual fact it is necessary to take the difference between each sample and the value represented by the previously transmitted encoded signal, otherwise quantisation errors will persist and accumulate in the transmitted signal. The principle can be extended by comparing each sample with a prediction of that sample value determined from the previously transmitted sample values. In the case of a television signal, these previously transmitted sample values may be based on the sample values in a preceding line or field of the television signal.

The encoding is effected with a non-linear quantizing scale, so that small difference signals are encoded more accurately than large difference signals. Because of this a fixed-amplitude low-frequency signal will be encoded more accurately than a high-frequency signal of the same amplitude, since with the high-frequency signal the difference between adjacent samples will be greater.

For most signals such a system is satisfactory, and in particular monochrome television video signals require greater accuracy at low frequencies than at high frequencies. But colour television signals, which consist of a luminance component and a chrominance component modulated onto a sub-carrier, carry low-frequency colour picture information at the relatively high sub-carrier frequency, and a more accurate representation of the chrominance components is therefore desirable.

According to the invention there is provided a method of encoding an input signal which includes a high-frequency component of frequency $f$ to provide an encoded output signal, comprising the steps of sampling at a sampling frequency substantially equal to N$f$, where N is a small integral ratio, taking the difference between the value of the input signal at each sampling instant and the value of the input signal represented by the output signal at an instant corresponding to a sampling instant which is substantially an integral number of cycles earlier at frequency $f$, and encoding the said difference with a non-linear quantising scale to provide the output signal. The sampling can take place before or simultaneously with either the step of taking the difference or the encoding.

The small integral ratio N may be from about two up to a value at which the change in amplitude of the signal of frequency $f$ between two consecutive sampling instants is sufficiently small to be encoded accurately.

Coding apparatus for use in the above-defined method may comprise an input terminal, a subtractor connected to the input terminal, an encoder connected to the output of the subtractor, an output terminal connected to the output of the encoder, first means within the encoder or connected in circuit between the input terminal and the encoder for sampling with a sampling frequency substantially equal to N$f$, and second means connected between the output of the encoder and the subtractor for decoding the output signal and applying to the subtractor the value of the input signal represented by the output signal at an instant corresponding to a sampling instant which is substantially an integral number of cycles earlier at frequency $f$.

Considering, for example, the application of the method to the encoding of a colour television signal, the sampling is effected at a frequency which is N times the colour sub-carrier frequency. A suitable value for N is three. Each sample is then subtracted from the sample which is 3 samples ahead of it. In this way the single signal containing the modulated chrominance is treated as 3 signals each containing only unmodulated signals. The samples are treated as if they were in 3 different groups, adjacent samples in each group being separated by one cycle of colour subcarrier. Thus, if sampling is locked to a multiple of the colour subcarrier frequency and the samples are treated as an appropriate number of groups, the difference signals will not contain any component at subcarrier frequency and differences between adjacent samples in the same group will be small and will represent only the modulation applied to the subcarrier. These differences can therefore be more accurately encoded.

The invention further provides a method of decoding a transmitted signal consisting of a series of encoded samples having a sampling frequency substantially equal to N$f$, where N is a small integral ratio, comprising the steps of decoding each incoming sample, and adding each incoming sample to the accumulated value of those preceding samples separated by substantially an integral number of cycles at frequency $f$ to provide an output signal, whereby a signal having a component of frequency $f$ is accurately reconstructed.

The invention also provides decoding apparatus for use in the method of the preceding paragraph, comprising an input terminal, means connected to the input terminal for decoding each incoming sample, and means for adding each incoming sample to the accumulated value of those preceding samples separated by substantially an integral number of cycles at frequency $f$ to provide an output signal.

The invention will now be described in more detail, by way of example, with reference to the accompanying drawings, in which.

Figure 1:
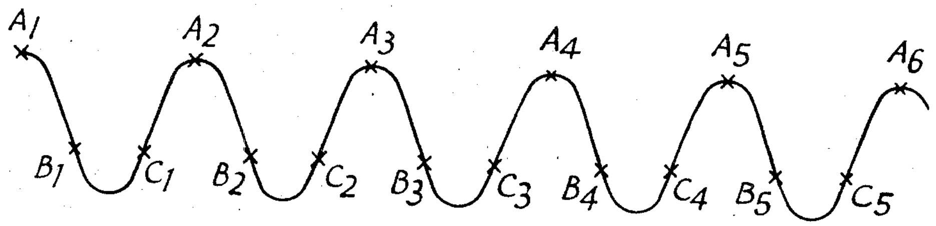
FIG. 1 is a waveform diagram showing sampling points.

A sine waveform as shown in FIG. 1 is usually sampled at plurality of points such as shown by the crosses. The sampling frequency should be at least twice the frequency of the waveform being sampled. With a differential code such as d.p.c.m. each sample is subtracted from the preceding sample and the difference thus obtained is encoded using a non-linear quantizing system, as described above.

In accordance with this invention the sampling points are considered as being in three groups A1–A6, B1–B5 and C1–C5 (as shown) and the differences are obtained by subtracting each sample from the immediately preceding sample in the same group, i.e., A3 is subtracted from A2 and not C2. The difference is therefore taken between samples which are separated by three times the interval between adjacent samples.

Figure 2:
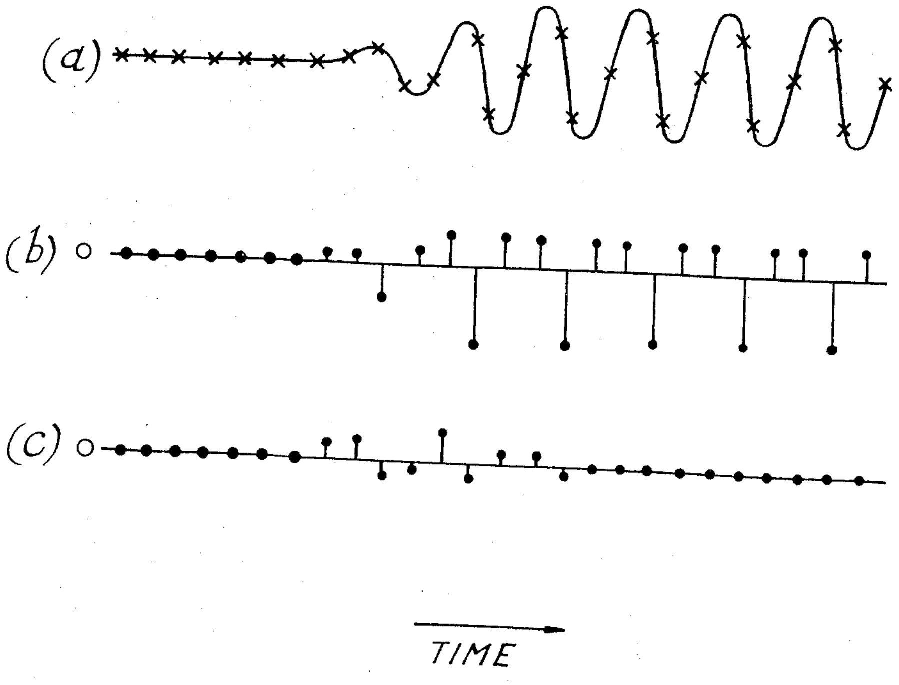
FIG. 2 is a waveform diagram showing an input waveform and the sampled output with two encoding systems.

Referring to FIG. 2, at *a* is shown a video waveform in which variations are caused by a colour subcarrier component. Conventional d.p.c.m. subtracts the amplitudes of the signal at successive sampling points to provide difference signals as shown at *b* which are then encoded. It will be seen that the difference signals continue with large amplitude. By subtracting samples from the preceding sample in the same group, the difference signals shown at *c* are obtained. These are of much smaller amplitude and thus can be much more accurately encoded, and only occur at all when the modulation on the subcarrier changes.

Ordinary d.p.c.m. with a sample rate of 9 MHz has been shown to give an increase in signal-to-noise ratio of 14 dB over straight p.c.m. if the optimum quantizing scale is used. This can be "traded in" for a saving of two bits per sample at the original signal-to-noise ratio. Because of the quantizing scale used, the higher frequencies will tend to be more coarsely quantizied than the low frequencies, and the coarsest quantizing will occur at one half of the sampling rate.

With a system embodying the invention, the effect is to have N ordinary d.p.c.m. systems working together on the same signal but sampling it in different phases. These separate signals will in effect each sample the signal at a rate of F/N times per second, where F is the original sampling frequency. This implies that the maximum frequency contained in any one of the N parallel streams will be F/2N, higher frequencies being described by the relationship between the streams. There will also be a complete null in each stream at F/N. Thus by setting F/N to equal the colour subcarrier frequency $f$ the problem of transmitting colour over a d.p.c.m. system can be overcome.

Each stream of samples will have a maximum frequency of $F/2N = f/2$ with no emphasis at any frequency due to the colour subcarrier. The same signal-to-noise improvement and consequent bit saving will be obtained as with ordinary d.p.c.m. The most coarsely quantized frequency, however, will be F/2N rather than F/2 (i.e. for a 5.5 MHz PAL signal in a system where $N = 3$, $F/2N = 2.2$ MHz) and quantizing errors will be concentrated in the first N to 2N samples (i.e. 3 to 6 samples) after a transition in the signal.

The sampling frequency is substantially equal to $Nf$, and we have achieved good results where the sampling frequency was up to 2 percent away from $Nf$. The preferred value for N is the next integer above $2f^1/f$ where $f^1$ is the highest signal to be encoded, and $f$ is the predominant high-frequency component. Thus for PAL television signals at the 625/50 standard where $f^1 = 5.5$ MH3 and $f = 4.43$ MHz, N is preferably 3. While N is preferably an integer, it can be a simple ratio $n/m$ such as 5/2 or 8/3. In this case the difference is taken between samples which are n samples apart, i.e., in cycles at frequency $f$.

Figures 3A, 3B:
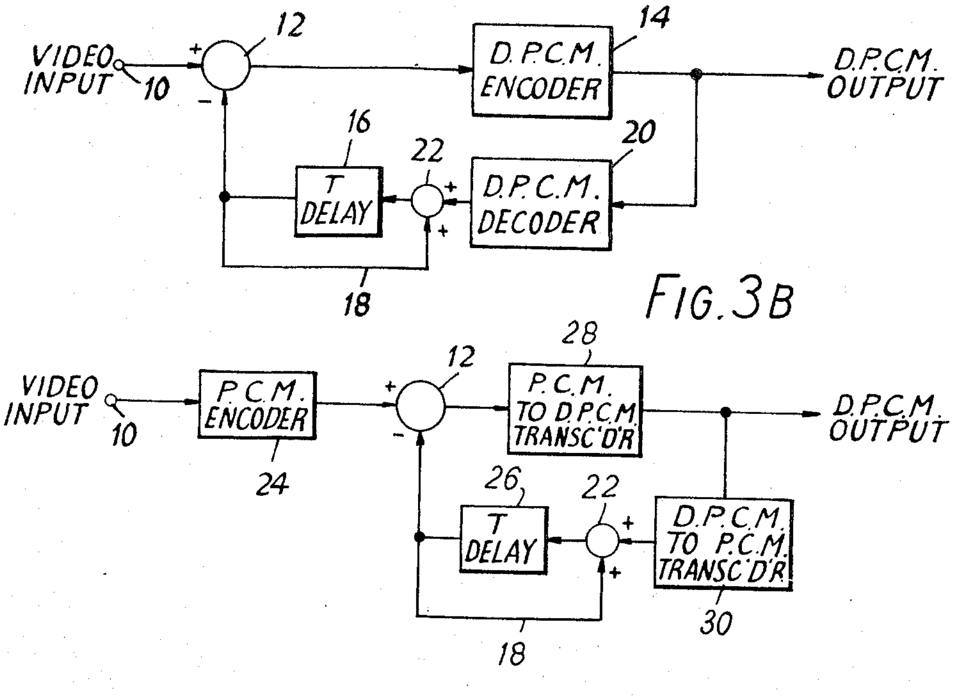
FIGS. 3A and 3B are block circuit diagrams of the two encoders embodying the invention.

While the N (or $n$) streams of samples could be transmitted in N separate channels, it can easily be arranged for them to be transmitted sequentially along the same channel. Suitable apparatus for this purpose is shown in FIG. 3A. An analogue video input 10 is applied to a subtractor 12. The output of the subtractor 12 is encoded in non-linear manner in a d.p.c.m. encoder 14 the output of which constitutes the output of the device. The encoder 14 samples the signal from the subtractor at frequency F and transmits the amplitude of this sample in a non-linear quantized code. The other, negative input of the subtractor 12 is supplied with the output of an analogue delay device 16 which is provided with a recirculation loop 18 so as to act as a store. A d.p.c.m. decoder 20 is connected to the output of the encoder 14 to decode the output and adds the resultant in an adder 22 to the signal in the recirculation loop 18. The sum of these two signals constitutes the input to the delay device 16.

The delay device 16 provides a delay time T which is three times the interval between successive samples taken in the d.p.c.m. encoder 14. The delay device may consist simply of a delay element, or may be constituted by a clocked analogue delay device, such as a so-called bucket-brigade device using capacitor storage.

The operation of the circuit will be clear from the foregoing description. The delay device 16 functions as a store, and decoded differential information alters the value in the store to approximate to the incoming signal. The output of the delay device 16 is representative of the signal received at a corresponding receiving terminal, and is compared with the input to generate difference signals showing the "error" between the incoming signal value and the value recovered at the receiving terminal.

By comparing the input signal with the value of the signal exactly one cycle of colour subcarrier previously, large amplitude swings derived solely from the subcarrier, and not is modulation, are avoided.

The circuit of FIG. 3B uses a clocked digital delay device 26 such as a shift register, and to achieve this a p.c.m. encoder 24 is inserted between the input 10 and subtractor 12. The output of the subtractor 12, which is in p.c.m. form, is now applied to a p.c.m. to a d.p.c.m. transcoder 28 which replaces the d.p.c.m. encoder 14 of FIG. 3A. The transcoder 28 transmits the samples applied to it in a non-linear quantized code. The negative output of the subtractor 12 is supplied with the output of the clocked delay device 26 which is again provided with a recirculation loop 18. A transcoder 30 is connected to the output of the transcoder 28 and removes the non-linearity introduced by the transcoder 28. The resultant is added in adder 22 to the signal in the recirculation loop 18. The sum of these two signals constitutes the input to the delay device 26.

The operation of the circuit of FIG. 3B is in many respects similar to that of FIG. 3A, except that the subtractor 12, adder 22 and delay device 26 operate with digital rather than analogue signals. The input signal is sampled at three times the subcarrier frequency in the p.c.m. encoder 24 and presented in p.c.m. form to the subtractor 12. The output of the delay device 26 is again representative of the p.c.m. signal recovered at a corresponding receiving terminal, and is compared with the p.c.m. input to generate difference signals showing the "error" between the incoming sample value and the value recovered at the receiving terminal.

In FIG. 3B the sampling is seen to take place prior to the differencing and encoding operation, while in FIG. 3A the sampling is effected at the same time as the encoding. It would be possible, however, to sample at any point between the input and the output.

Figure 4A:
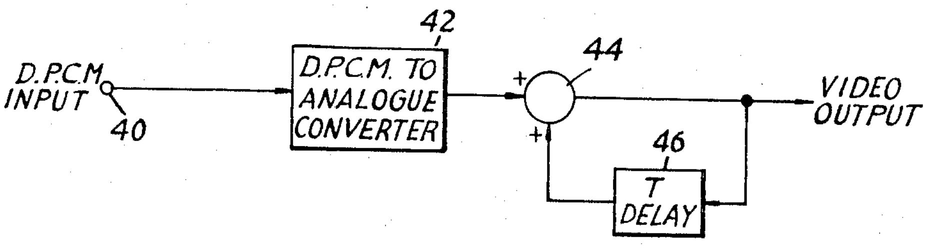
FIGS. 4A and 4B are block circuit diagrams of two corresponding decoders embodying the invention.
Figure 4B:
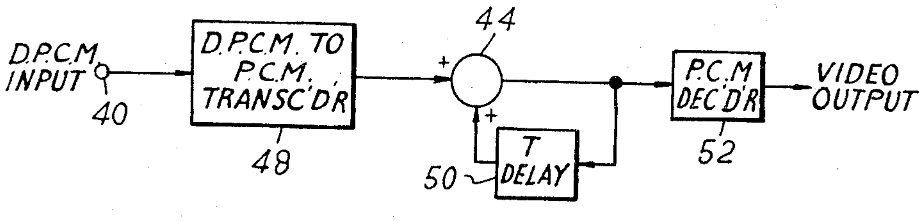

FIGS. 4A and 4B show corresponding receiving terminals for the transmitting terminals of FIGS. 3A and 3B. The d.p.c.m. signal is received at an input 40 and in FIg. 4A is decoded to analogue form in a decoder 42. The output is accumulated through a gate 44 and analogue delay device 46 so that the incoming sample is added to the cumulative value of the preceding samples of the same group. The delay device 46 provides the same delay time as the delay device 16 of FIG. 3A.

In FIG. 4B the input signal is first applied to a transcoder 48 which removes the non-linearity introduced by the transcoder 28 of FIG. 3B. The output of the transcoder 48 is accumulated through a gate 44 and digital delay device 50 so that the incoming sample is added to the cumulative value of the preceding samples of the same group. Finally the output of the adder 44 is applied to a p.c.m. decoder 52 which provides an analogue output signal.

The Embodiments of the Invention in which an Exclusive Property or Privilege is claimed are defined as follows:

1. A method of encoding an input signal which includes a high-frequency component of frequency *f* to provide an encoded output signal, comprising the steps of:

sampling at a sampling frequency substantially equal to N*f*, where N is a ratio of small integers, taking the difference between the value of said input signal at each sampling instant and the value of said input signal represented by said output signal at an instant corresponding to a sampling instant hich is substantially an integral number of cycles earlier at frequency *f;* and encoding said difference with a non-linear quantizing scale to provide said output signal, whereby modulation of said high-frequency component is encoded with increased accuracy.

2. A method according to claim 1, wherein said sampling takes place simultaneously with said encoding.

3. A method according to claim 1, wherein said sampling takes place before said step of taking the difference.

4. A method according to claim 1, wherein N is an integer greater tan one, and the difference is taken between the value of said input signal at each sampling instant and the value of said input signal represented by said output signal at an instant corresponding to the sampling instant which is N sampling instants earlier.

5. A method of encoding an input colour television signal according to claim 1, wherein the colour subcarrier is of frequency *f.*

6. A method according to claim 5, where N is the next integer above $2f^1/f$, where $f^1$ is the highest signal to be encoded.

7. Coding apparatus for encoding an input signal which includes a high-frequency component of frequency *f*, said apparatus comprising:

an input terminal;

a subtractor connected to said input terminal;

an encoder connected to the output of said subtractor for encoding with a non-linear quantizing scale;

an output terminal connected to the output of said encoder;

first means connected in circuit between the input terminal and the output of said encoder for sampling with a sampling frequency substantially equal to N*f*, where N is a ratio of small integers; and second means connected between said output of said encoder and said subtractor for decoding the output signal and applying to said subtractor the value of said input signal represented by said output signal at an instant corresponding to a sampling instant which is substantially an integral number of cycles earlier at frequency *f*, where by modulation of said high-frequency component is encoded with increased accuracy,

8. Apparatus according to claim 7, wherein said first means is between the subtractor and said output of said encoder; and said second means comprises a decoder connected to said output of said encoder, a delay device providing a delay of substantially an integral number of cycles at frequency f connected between the output of said decoder and said subtractor, and an adder for adding the output of said decoder to the output of said delay device and applying the resultant as the input to said delay device.

9. Coding apparatus for encoding an input signal which includes a high-frequency component of frequency *f*, said apparatus comprising:

an input terminal;

a subtractor connected to said input terminal;

an encoder connected to the output of said subtractor for encoding with a non-linear quantizing scale;

an output terminal connected to the output of said encoder;

means connected between said input terminal and said subtractor for sampling with a sampling frequency substantially equal to N*f*, where N is a ratio of small integers;

a decoder connected to the output of said encoder;

a closed storage device providing a delay of substantially an integral number of cycles at frequency *f* connected between the output of said decoder and said subtractor; and an adder for adding the output of said decoder to the output of said storage device and applying the resultant as the input to said storage device, whereby modulation of said high-frequency component is encoded with increased accuracy.

10. A method of decoding a transmitted signal consisting of a series of encoded samples having a sampling frequency substantially equal to N*f*, where N is a ratio of small integers, said method comprising the steps of decoding each incoming sample, and adding each incoming sample to the accumulated value of those proceding samples separated by substantially an integral number of cycles at frequency *f* to provide an output signal, whereby a signal having a component of frequency *f* is accurately reconstructed.

11. A method of decoding a transmitted signal representative of a colour television signal, according to claim 10, wherein the colour subcarrier of the television signal is of frequency *f.*

12. Decoding apparatus for decoding a transmitted signal consisting of a series of encoded samples having a sampling frequency substantially equal to N*f*, where N is a ratio of small integers, said apparatus comprising an input terminal; means connected to the input terminal for decoding each incoming sample; and means for adding each incoming sample to the accumulated value of those preceding samples separated by substantially an integral number of cycles at frequency $f$ to provide an output signal, whereby a signal having a component of frequency f is accurately reconstructed.

13. Apparatus according to claim 12, wherein said decoding means is arranged to provide an analogue signal, and said adding means comprises an adder having one input connected to the output of said decoding means, and a delay device providing a delay of substantially an integral number of cycles at frequency $f$ connected between the output and a second input of said adder.

14. Apparatus according to claim 12, wherein said decoding means is arranged to provide a pulse signal, and said adding means comprises an adder having one input connected to the output of said decoding means, and a clocked storage device providing a delay of substantially an integral number of cycles at frequency $f$ connected between the output and a second input of said adder.

* * * * *

Notice of Adverse Decision in Interference

In Interference No. 98,741, involving Patent No. 3,800,225, D. J. Meares, DIFFERENTIAL PULSE-CODE MODULATION, final judgment adverse to the patentee was rendered Jan. 30, 1975, as to claims 1, 2, 4, 5 and 10–13.

[*Official Gazette May 6, 1975.*]